No. 810,897. PATENTED JAN. 30, 1906.
C. E. ACKER.
APPARATUS FOR PRODUCING COMPOUNDS OF TIN.
APPLICATION FILED JUNE 8, 1903. RENEWED JUNE 22, 1905.
2 SHEETS—SHEET 1.
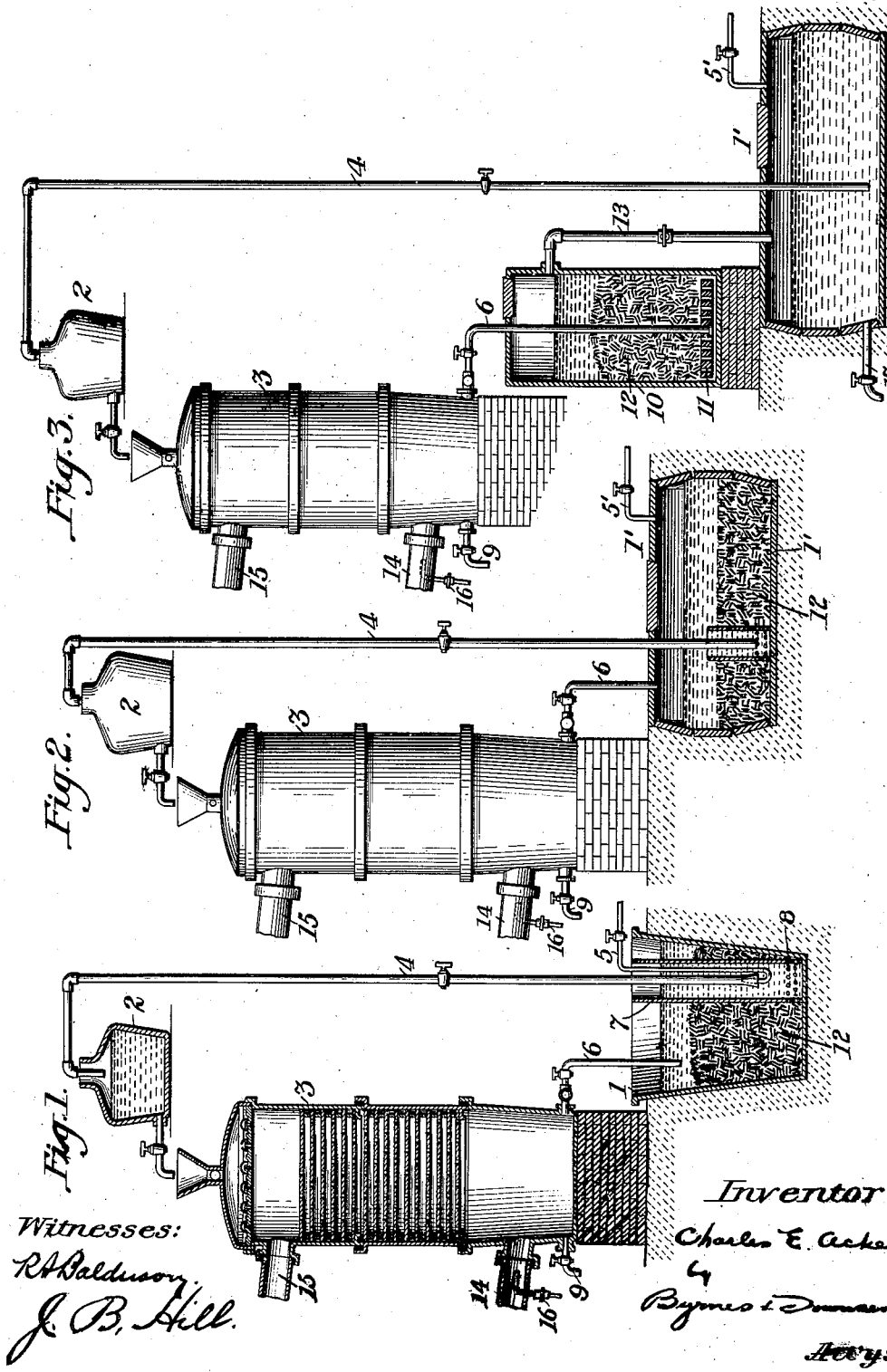

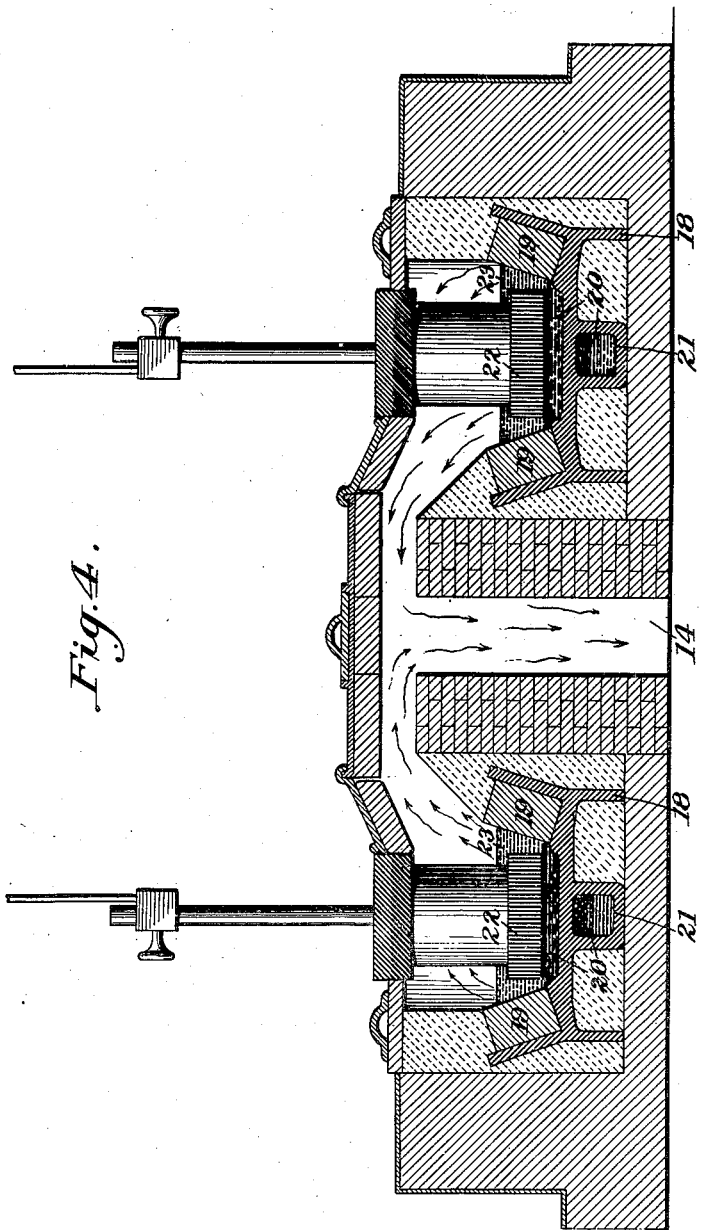

UNITED STATES PATENT OFFICE.

CHARLES E. ACKER, OF NIAGARA FALLS, NEW YORK, ASSIGNOR TO ACKER PROCESS COMPANY, A CORPORATION OF NEW JERSEY.

APPARATUS FOR PRODUCING COMPOUNDS OF TIN.

No. 810,897.            Specification of Letters Patent.            Patented Jan. 30, 1906.

Application filed June 8, 1903. Renewed June 22, 1905. Serial No. 266,507.

*To all whom it may concern:*

Be it known that I, CHARLES E. ACKER, a citizen of the United States, residing at Niagara Falls, in the county of Niagara and State of New York, have invented certain new and useful Improvements in Apparatus for Producing Compounds of Tin, of which the following is a specification.

This invention is an apparatus designed particularly for dissolving tin and producing solutions thereof.

Heretofore it has been customary to prepare stannic-chlorid solutions by reacting upon metallic tin with hydrochloric acid in solution, thereby forming stannous chlorid, and subsequently converting said stannous chlorid to stannic chlorid by addition of potassium chlorate to the acid solution. This process is relatively expensive, since the chlorin is derived from the comparatively costly compounds hydrochloric acid and potassium chlorate, and is furthermore subject to the disadvantages that the solutions produced cannot in practice exceed a density of 50° to 51° Baumé and are contaminated by the presence of considerable quantities of potassium chlorid derived from the reduction of the chlorate. Furthermore, it is impractical to concentrate such solutions, by reason of the loss of stannic chlorid by volatilization and the tendency of the solutions to become basic. Solutions of a density of 60° Baumé have been prepared by first producing a solution of stannous chlorid, concentrating the same to saturation, and subsequently converting it, by means of potassium chlorate, to stannic chlorid; but this process is an expensive one, and the solutions obtained are also contaminated by potassium chlorid.

I have discovered that stannic-chlorid solutions of high concentration and uncontaminated by impurities of any kind may be produced by circulating a solvent containing chlorin successively and repeatedly in contact with metallic tin and in contact with a reagent capable of converting the tin in solution from the divalent to the tetravalent state and have claimed such process in my copending application, Serial No. 160,564, filed June 8, 1903. I have also discovered that if such stannic-chlorid solutions having a specific gravity equal to or exceeding 1.800 be converted by contact with metallic tin to stannous-chlorid solutions of a corresponding concentration the stannous chlorid will separate from said solutions in the form of crystals of a high degree of purity. Such process I have claimed in my copending application, Serial No. 160,565, filed June 8, 1903.

The present invention is an apparatus which may be employed for carrying out either of the processes above referred to.

For a full understanding of my invention reference is made to the accompanying drawings, wherein—

Figure 1 shows in vertical section one form of apparatus which may be used for carrying out my process. Fig. 2 is a similar view showing a modified form thereof. Fig. 3 is a similar view of a further modification. Fig. 4 shows in vertical section a form of electrolytic cell which may serve as a source of chlorin or of a gaseous mixture containing chlorin.

Referring to Fig. 1, 1 represents a vat or tank which may conveniently be of glazed earthenware. 2 is a storage-reservoir, and 3 a reaction tower, shown as of the Rohrmann type, but which may be of any desired character. Means, consisting of a conduit 4 and an air-injection pipe 5, leading into the lower portion thereof, are provided for continuously or intermittently conveying the solution in the tank 1 to the storage-reservoir 2. From said reservoir the liquid is permitted to flow downwardly through tower 3 and to return thence by conduit 6 to the vat 1. The vat 1 contains, in addition to the liquid to be hereinafter described, a mass of metallic tin, preferably in a suitably-divided condition, and to maintain a body of clear liquid in the region of the inlet to the conduit 4 said conduit is surrounded by a protective casing 7, which is conveniently provided with apertures 8 at the lower end for the admission of the liquid.

My process depends upon the fact that certain tin salts in which the tin is in the tetravalent state are extremely energetic solvents for metallic tin, the metal passing into solution and the solvent liquid being reduced to the divalent state. The liquid having thus lost its solvent power for tin is thereupon brought into contact with chlorin-gas under the conditions to be hereinafter described, whereby it is again raised to the tetravalent condition, with corresponding restoration of its solvent power. This regenerated solvent is again brought into contact with metallic tin and again regenerated, the operation proceeding in this manner until the required concentration is reached, whereupon the stannic-chlorid solution is withdrawn from the system—for instance, through the cock 9—and is utilized as desired, an equivalent amount of water or a suitable chlorid solution being added and the process continued as before. If desired, the process may be made continuous by the gradual withdrawal of the stannic-chlorid solution and the addition of corresponding quantities of water or chlorid solution. To obtain the solution containing the tin in the tetravalent condition, it should be withdrawn from the system at a point immediately following the treatment with chlorin. If the liquid contains an excess of chlorin, said excess is removed by the careful addition of stannous chlorid, and a clear, pure, colorless, and dense solution is obtained. To obtain a solution containing the tin in the divalent condition, it may be withdrawn from the system at a point immediately following the treatment with metallic tin, or, if desired, the solution may be withdrawn as stannic chlorid and subsequently subjected in a separate vessel to the action of metallic tin to convert it into stannous chlorid. From solutions so produced the stannous chlorid will separate in the form of crystals of a high degree of purity, and if the stannous-chlorid solution is formed at a temperature above the normal—say at about 50° or 60° centigrade—a large yield of the crystals will be obtained when the solution is permitted to cool.

Fig. 2 shows a modified form of device in which the liquid after being subjected to the action of chlorin in the reaction-tower 3 is permitted to flow into one of a series of pressure-tanks 1', a number of such tanks being provided and filled and discharged in succession, as will be readily understood. Said tanks 1' contain metallic tin, and after the solvent has been permitted to remain in contact therewith for a sufficient time the tank is closed and air-pressure applied above the surface of the liquid by means of a pipe 5', the liquid being thereby forced to the upper reservoir 2, from which it returns through the tower 3, as above described. It will be obvious that any suitable means for securing the circulation of the liquid may be substituted for those described.

In Fig. 3 I have shown a further modification wherein an intermediate tank, tower, or vat 10 is provided to contain the metallic tin and permit the reaction therewith of the solvent liquid from the tower. In said tank 10 I have shown a distributing-plate 11 for the inflowing solution and a discharge-pipe 13 for the delivery of the same to the pressure-tank or other elevating device 1'. 17 is a cock for withdrawing the solution from the pressure-tank.

The construction of the apparatus may be considerably varied without departure from my invention, the essential features being a dissolving-tank for metallic tin, a reaction-tower in operative connection therewith, and means for producing a dilute gaseous mixture containing chlorin communicating with said reaction-tower.

I have shown at 14 15 an inlet and outlet, respectively, for the gas which serves to convert the tin from its divalent to its tetravalent condition and have referred to this gas as "chlorin." I have discovered, however, that it is neither necessary nor advisable to use pure chlorin gas for this purpose, but that the gas may contain a large proportion of air or oxygen. I have further discovered that the reaction is facilitated by the injection of steam into the chlorin, as by pipe 16, with the consequent formation of hydrochloric acid or by the use of chlorin containing a certain proportion of hydrochloric acid.

I have employed a gaseous mixture containing ninety-five to ninety-six per cent. of air, four to five per cent. chlorin, and a small percentage of hydrochloric acid. It will be understood that the reaction evolves a considerable amount of heat and that the temperature if uncontrolled would rise rapidly to a point at which stannic chlorid would be volatilized. The use of dilute chlorin as described possesses the advantage that a portion of this heat is absorbed in raising the temperature of the large volume of gas so provided and that, therefore, it is possible to utilize larger absolute quantities of chlorin in a given time—that is to say, one result of employing a dilute gas is to materially increase the output from a given apparatus. The addition of hydrochloric acid or the utilization of gases containing hydrochloric acid results in the acceleration of the solvent action of stannic chlorid upon metallic tin and serves also to prevent the formation of oxychlorids of tin, the presence of which may in some cases be undesirable.

It will be understood that the dilution of the chlorin need not be so great as above indicated by way of example and that proportionate effects are secured by the use of smaller proportions of the diluent.

A gas possessing the general characteristics above referred to may be conveniently produced by the operation of my electrolytic cell, substantially as described in my prior patent, No. 674,691, issued May 21, 1901, and as illustrated in Fig. 4, in which two cells of this character are shown in operative connection with a common chlorin-flue 14.' Said cells comprise an iron frame or bed 18, lined interiorly with magnesia bricks 19. The cathode consists of a body of lead 20, which in operation is maintained in fusion and is circulated beneath carbon anodes 22. 23 is a body of sodium chlorid which is electrolyzed, the sodium passing to the lead cathode and the chlorin being conducted to the flue 14 and thence to the reaction-tower. The conduit 14, above described as an inlet for the gas which serves to convert the tin from a divalent to a tetravalent state, may be, therefore, the outlet of an electrolytic cell in which chlorin is produced, suitable means being provided for insuring the dilution of the chlorin. In the construction illustrated the chlorin is diluted by means of air drawn into the cell by a suction-fan operating in connection with the chlorin-conduit 14 or outlet 15 and may also be diluted, if desired, by the introduction of steam at 16.

It will be obvious that the character of the original liquid, which under the conditions of my process is to become a solution of stannic chlorid, may be considerably varied. Thus water may be employed, or any desired proportion of stannic chlorid, stannous chlorid, hydrochloric acid, or stannous or stannic oxychlorid may be added thereto. In any case the result of the treatment by chlorin is to form a solvent for tin, and the result of the repeated utilization and regeneration of this solvent is to form solutions of stannic chlorid of a concentration heretofore unattainable. The result of the final conversion of stannic-chlorid solutions thus produced to the divalent state is to form solutions of stannous chlorid of a concentration heretofore unattainable in a commercial way and from which the salt may be obtained in the form of crystals of high purity.

The reaction proceeds with great facility at a temperature of 50° to 60° centigrade; but the process may be carried out at any temperature below the point at which stannic chlorid is volatilized.

I claim—

1. An apparatus for producing chlorin compounds of tin, comprising a dissolving vessel for effecting the solution of tin in a solvent containing chlorin, a reaction-tower, means for circulating the solution through said dissolving vessel and reaction-tower, means for producing a gaseous mixture containing chlorin and a diluent in sufficient proportion to prevent undue rise of temperature, and means for delivering said mixture to said reaction-tower, substantially as described.

2. An apparatus for producing chlorin compounds of tin, comprising a dissolving vessel for effecting the solution of tin in a solvent containing chlorin, a reaction-tower, means for circulating the solution through said dissolving vessel and reaction-tower, means for producing a gaseous mixture containing chlorin and hydrochloric acid, and means for delivering said mixture to said reaction-tower, substantially as described.

3. An apparatus for producing chlorin compounds of tin, comprising a dissolving vessel for effecting the solution of tin in a solvent containing chlorin, a reaction-tower, means for circulating the solution through said dissolving vessel and reaction-tower, means for producing a gaseous mixture containing chlorin, means for introducing steam into said mixture, and means for delivering said mixture to said reaction-tower, substantially as described.

4. An apparatus for producing chlorin compounds of tin, comprising a dissolving vessel for effecting the solution of tin in a solvent containing chlorin, a reaction-tower, means for circulating the solution through said dissolving vessel and reaction-tower, an electrolytic cell for the production of chlorin, means for diluting the chlorin produced by said cell, and means for delivering the diluted chlorin to said reaction-tower, substantially as described.

In testimony whereof I affix my signature in presence of two witnesses.

CHARLES E. ACKER.

Witnesses:
J. H. SCHERMERHORN,
D. S. MACKAY.